W. F. WIDMAYER.
Rotary Printing Machine.

No. 198,479. Patented Dec. 25, 1877.

6 Sheets—Sheet 1.

WITNESSES:

INVENTOR:
PER
ATTORNEY.

W. F. WIDMAYER.
Rotary Printing Machine.

No. 198,479. Patented Dec. 25, 1877.

WITNESSES:
H. B. Brown
Jas. F. DuHamel

INVENTOR:
Wm. F. Widmayer.
PER
H. A. Abbot.
ATTORNEY.

W. F. WIDMAYER.
Rotary Printing Machine.
No. 198,479. Patented Dec. 25, 1877.
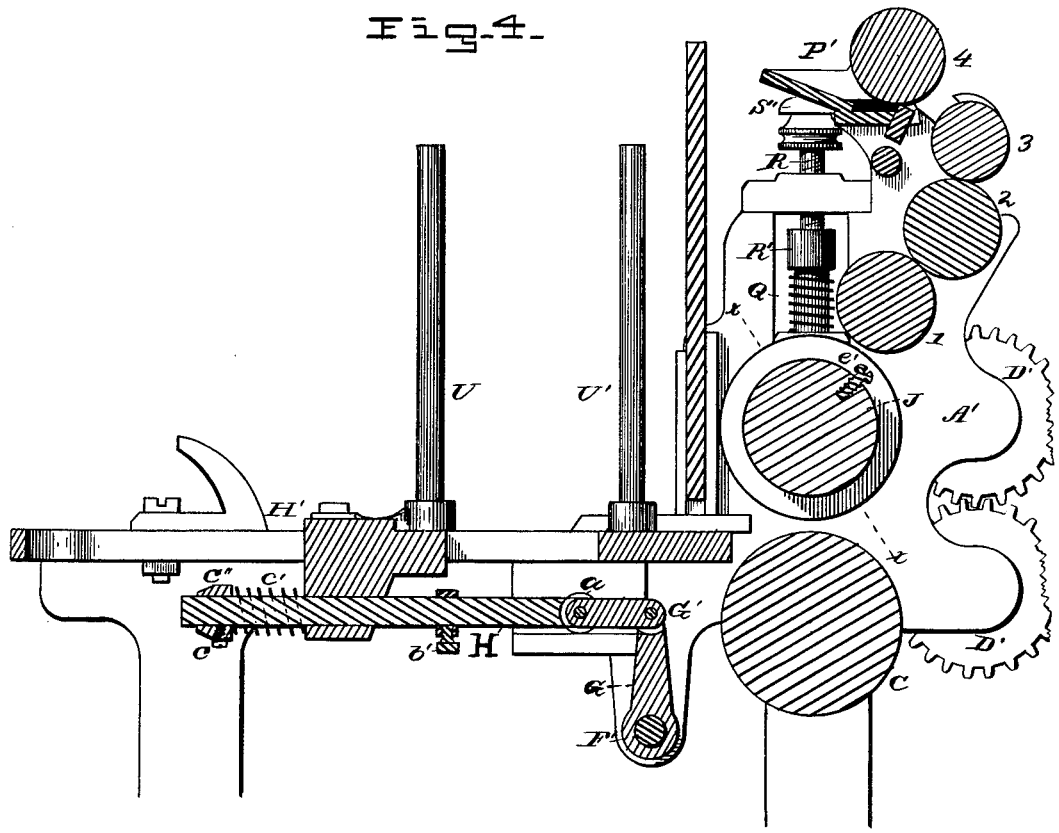
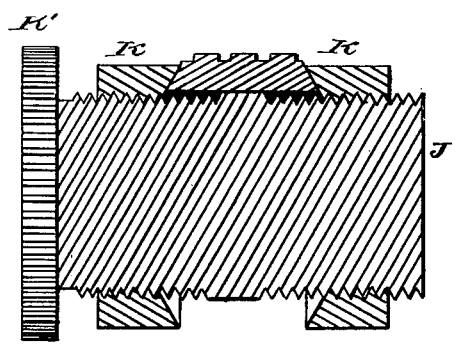
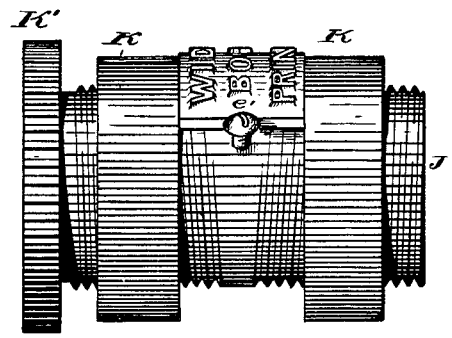

W. F. WIDMAYER.
Rotary Printing Machine.
No. 198,479. Patented Dec. 25, 1877.
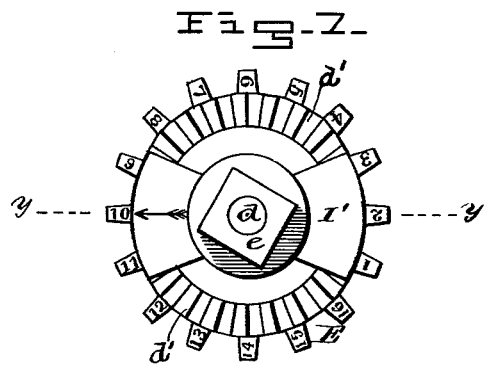
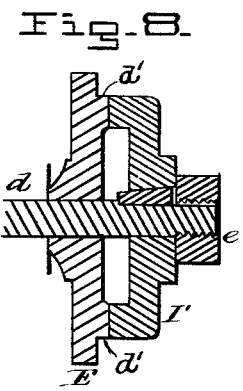
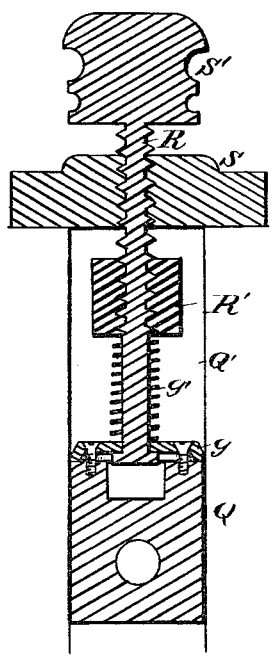

W. F. WIDMAYER.
Rotary Printing Machine.

No. 198,479. Patented Dec. 25, 1877.

UNITED STATES PATENT OFFICE.

WILLIAM F. WIDMAYER, OF NEW YORK, N. Y.

IMPROVEMENT IN ROTARY PRINTING-MACHINES.

Specification forming part of Letters Patent No. 198,479, dated December 25, 1877; application filed July 21, 1877.

*To all whom it may concern:*

Be it known that I, WM. F. WIDMAYER, of New York, in the county of New York and State of New York, have invented certain new and useful Improvements in Rotary Printing-Machines; and I do hereby declare that the following is a full, clear, and exact description thereof, which will enable others skilled in the art to which it appertains to make and use the same.

This invention relates to certain improvements in box and label printing machines; and the invention consists in the special construction, arrangement, and combination of parts, which will be hereinafter more fully set forth.

In order to enable others skilled in the art to which my invention appertains to make and use the same, I will now proceed to describe its construction, arrangement, and operation, reference being had to the accompanying drawing, which forms a part of this specification, and in which—

Figure 1:
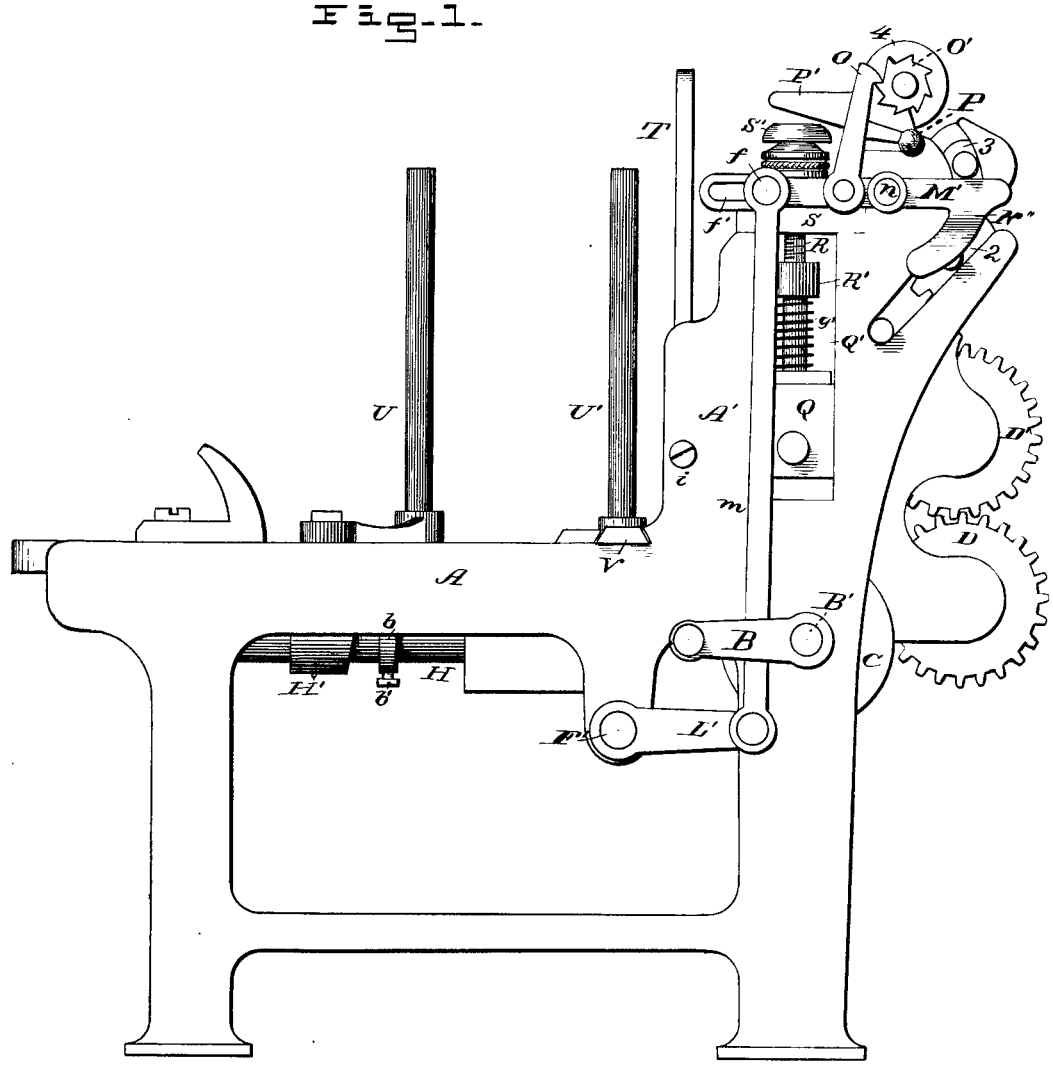
Figure 2:
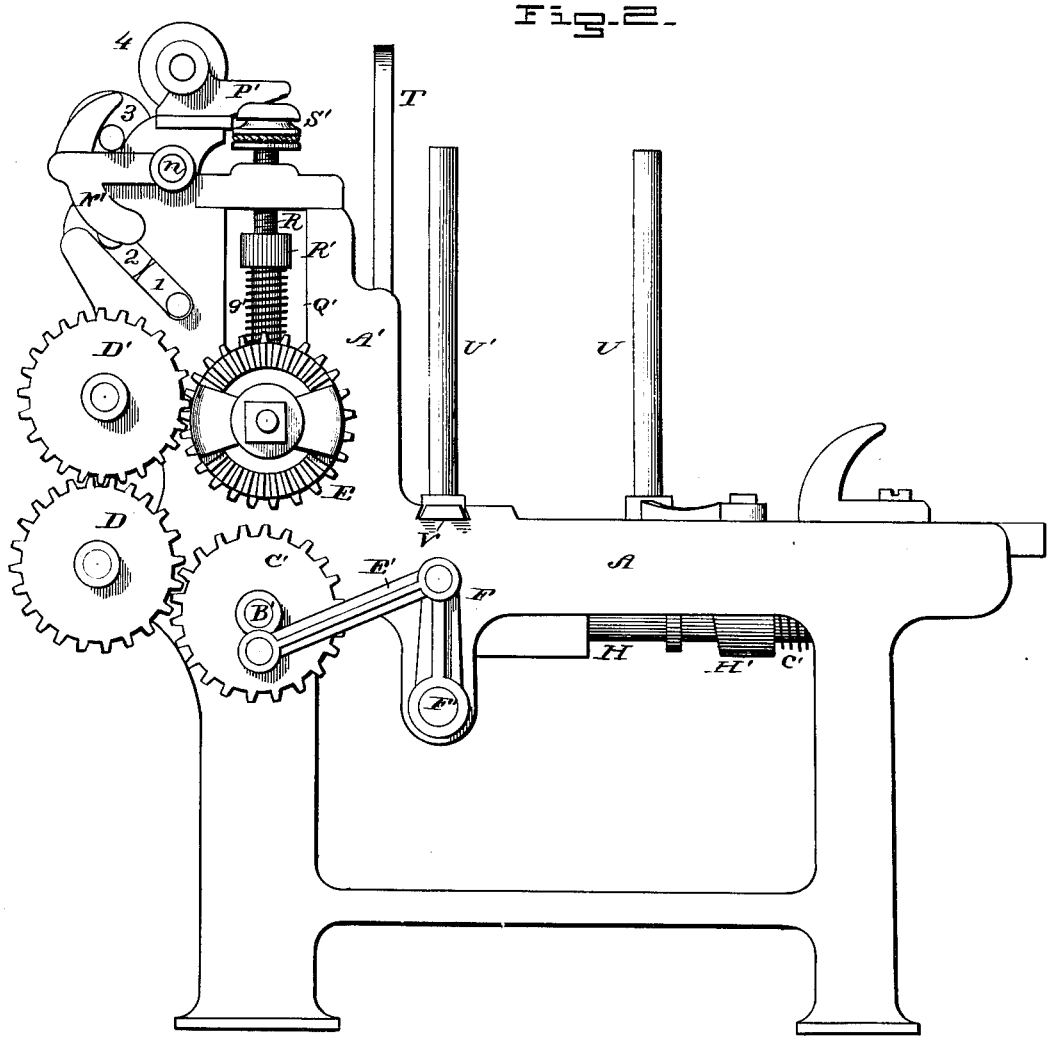
Figure 3:
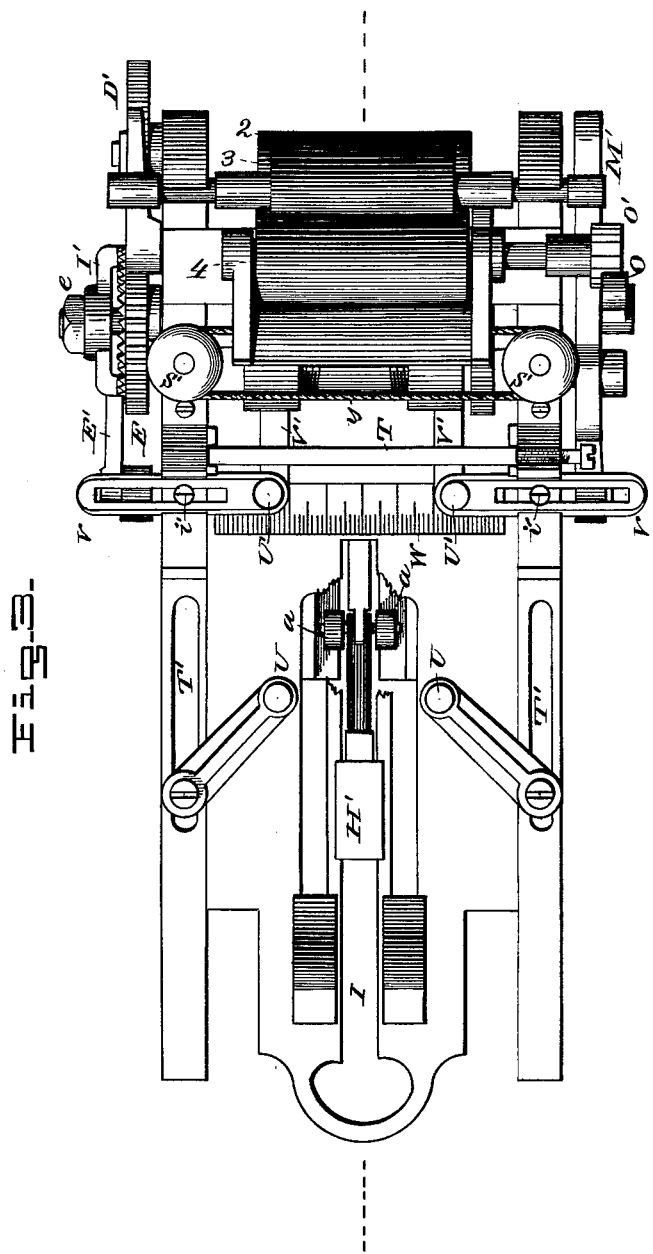
Figure 10:
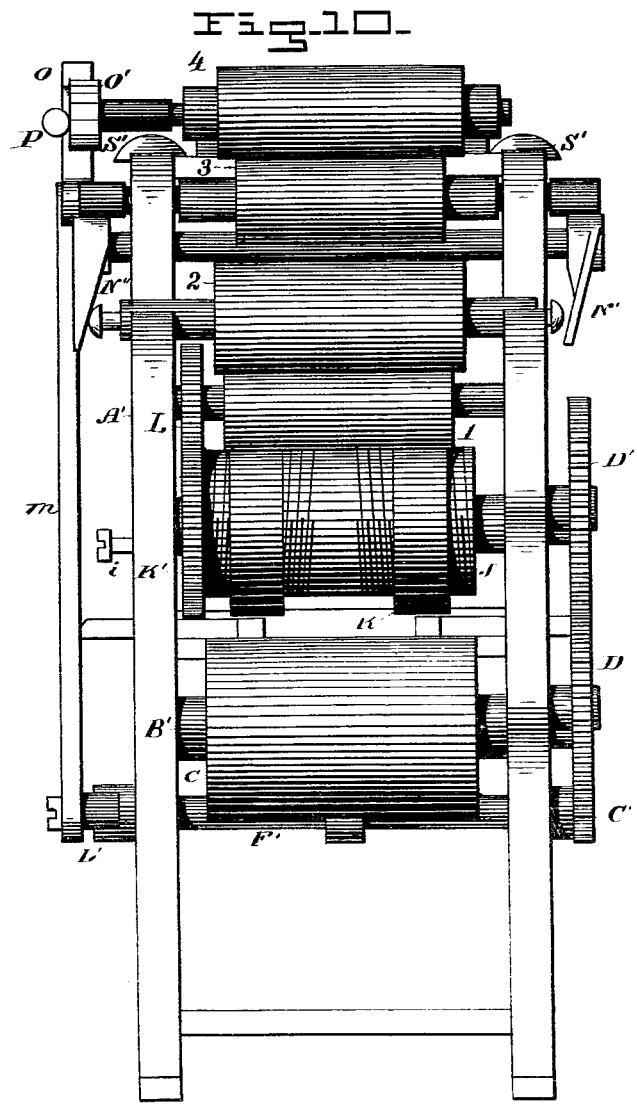

Figure 1 is a side elevation; Fig. 2, a side elevation, showing the gearing for operating the type-cylinder; Fig. 3, a top view, showing the scale of adjustment of the hopper or guide-rods, by which means blanks of different sizes are fed up to be printed. Fig. 4 is a central vertical longitudinal section. Fig. 5 is a longitudinal section of the type-cylinder on the line $x\ x$ of Fig. 4. Fig. 6 is a view showing the type-cylinder and its adjustable type-fastening device. Fig. 7 is a front or plan view of the type-cylinder indicator. Fig. 8 is a section on the line $y\ y$ of Fig. 7. Fig. 9 is a central vertical section of the automatic and hand adjustment of the type-cylinder. Fig. 10 is an end view, showing the ink-rollers and gearing.

A denotes the frame, constructed in any suitable manner, having vertical extensions A'. Motion is given the machine by the crank B, or a suitable pulley arranged on the shaft B', which latter is provided with a drum or pressure-roller, C. On the other end of this shaft B' is a cog-wheel, C', which meshes with the cog-wheel D, arranged on a suitable gudgeon, or other device forming its bearing, to the side of the frame. The cog-wheel D meshes with a cog-wheel, D', which has a similar bearing to that of the cog-wheel D. The cog-wheel D' meshes with a cog-wheel, E, attached to the type-cylinder, as will be hereinafter more fully set forth.

To the cog-wheel C' is connected a pitman, E', having its opposite end connected with a crank, F, of the shaft F', which is centrally provided with an arm, G, which, by a link, G', is connected with the rod H, which passes through the feeding-slide H', as shown, which forms a loose bearing for this end of the rod. The other end is provided with two friction-rolls, $a$, (shown in Figs. 3 and 4,) and supported in ways or brackets having inwardly-projecting flanges arranged to allow the required movement of the arm G. On this rod H is placed an adjustable stop, $b$, provided with a thumb-screw, $b'$, to retain it at any desired place on said rod. One end of the rod H is provided with an adjustable collar or ring, C'', retained in position by a screw, $c$, and a spring, $c'$, as shown.

The slide H' travels in a suitable slot, I, longitudinally arranged in the center of the table.

The cog or index wheel E is loosely arranged on the type-cylinder shaft $d$, and is provided on its face with teeth $d'$, which engage with a serrated or toothed clamp or indicator, I', keyed to the shaft $d$, and held in place by a nut, $e$. On this shaft $d$ is arranged the type-cylinder J. This type-cylinder is provided with two annular inwardly-chamfered clamps, K, and a right and left screw-thread, as shown, for fastening the printing-plates thereto. To keep the plate from slipping around the cylinder, I provide said cylinder with a pin, $e'$, as shown.

The annular clamps are, by the motion of the machine, kept well up against the plate, thereby preventing it from slipping or moving after once having been properly arranged for printing.

To the type-cylinder, or on its shaft, is placed a cog-wheel, K', which meshes with a smaller cog-wheel, L, of the ink-roller 1. This ink-roller is arranged in proper housings in the vertical extension A' of the frame A. In the same housings is placed another ink-roller, 2, whose ink-surface rests on that of the ink-roller 1. Another ink-roller, 3, is supported in suitable slots in the top of the extension A', extending at an angle down toward the rollers 1 and 2, as shown in Figs. 1 and 2 of drawing.

To the crank L' of the shaft F' is attached one end of a pitman, m, the other end of which is, by a suitable pin, f, retained in a slot, f', of the lever M', having an arm, N", and centrally connected to a shaft, N, which is provided with a downwardly-projecting arm, N'. These arms N' N" have their inner side made slanting at a suitable angle, as shown in Fig. 10 of drawings, for sliding the ink-roller, whose gudgeons extend out and in contact with the sides of the arms.

To the lever M' is secured a hooked pawl, O, which operates the ratchet-wheel O' of the ink-roller 4. This pawl O is provided with a weighted arm, P, for keeping it in position on the ratchet-wheel O'. The ink-roller 4 has bearings on the ink-fountain, and is arranged to feed ink to the roller 3, as will be hereinafter fully set forth.

The bearings Q of the type-cylinder J are adjustably arranged in the vertical slots Q' in the extension A' of the frame A. These bearings have a hand and self adjustment, which will be hereinafter more fully set forth.

R is a headed screw, passed through the plate g, which is secured to the bearings Q in any suitable manner. On the screw R is placed a spring, g', held in place by a nut, R'. The screw is then passed through the block S, which is secured to the frame, thereby suspending the bearings in the slot Q', as shown. The upper ends of the screws are provided with sheaves S', and are connected by chains y, which give the sheaves a uniform movement.

The gate T is arranged in vertical grooves on the inside of the frame-extension A', and may be adjusted as required by the thickness of the blank to be printed upon, and retained by the screw i, thereby preventing more than one blank from being fed to the type-cylinder at a time.

In the slots T' are pivoted rods U, which, together with the rods U', form the hopper for holding the blanks. The rods U' have their arms V slotted, as shown, and are set in dovetailed grooves, to allow of their proper adjustment, and are retained by thumb-screws i'. The arms V are provided with arms V', extending toward the type-cylinder, to guide the blank, as will be hereinafter set forth.

W is a scale, by which the adjustment of the arms V' is regulated, to guide the blank for printing upon a certain desired spot.

The operation is as follows: Motion being given the shaft B', the cog-wheels C', D, and D' will, in turn, operate the cog-wheel E of the type-cylinder shaft d, and at the same time the pitman E' will rock the crank F of the shaft F', which, in turn, will operate the feed mechanism by its arm G being connected with the rod H. As the rod H passes loosely through the slide H' it will, on its back movement, carry the slide as far from under the pile of blanks as shall be regulated by the stop b, and on the forward movement, if the blank should get caught in any way, the spring, which is strong enough to push the blank into the rollers, will give, thus allowing the machine to keep on running without any possibility of breakage.

When the blank is to be turned sidewise, the arms V' are, by the scale W, set to guide the blank up to the rollers, to be centrally or otherwise printed upon, as may be desired.

By the index-wheel E the type-cylinder is set to meet the blank and properly print thereon. The numbers on said index-wheel correspond with the number of the type-plates, which are of known sizes. For instance, say the numbers on the index-wheel represent inches, and a type-plate ten inches long is to be used. The nut e is unscrewed, and the indicator set at No. 10. The cylinder will then, on being revolved, meet the blank with its printing-surface, and print thereon in the desired place.

The indicator also answers the double purpose of preventing the type-cylinder shaft from slipping around by means of the feather in said shaft and the serrated side of cog-wheel and indicator.

Each figure on the index-wheel conforms with the size or number of each type-plate of a set used. For instance, if plate No. 10 is to be used, the indicator is placed at 10 on the index-wheel.

At each movement of the shaft F the pitman m operates the lever m', which shoves the ink-roller 3 up to the roller 4 of the ink-fountain. The roller 4 is, by the pawl O, revolved one notch on the ratchet-wheel O', thereby supplying the roller 3 with a certain amount of ink. This supply of ink may be regulated by adjusting the knife operating under roller 4. The roller 3 having received ink, it imparts so much thereof to the roller 2. This roller is given a side movement for spreading the ink over the roller 1. This is accomplished by the arms N' and N", by reason of their slanting sides, as shown in Fig. 10 of the drawing. As they descend the roller is forced to one side, and on the upward movement it is forced back. While this is taking place the cog-wheel K' of the type-cylinder J, by the cog-wheel L, revolves the roller 1, which revolves the roller 2. By this means the ink is evenly spread over the roller 1, which inks the type at every revolution of the cylinder J.

The type-cylinder is set to suit the thickness of the blank by turning one of the sheaves S', which will impart to the other, by the chain y, a like movement, and thereby giving both sides of the cylinder the same adjustment.

The tension of the spring g' may be regulated by turning the nut R', so as to be able to print deep into the various kinds of wood, which differ materially in density. The spring $g'$ also permits the cylinder to adapt itself to any irregularity that may occur in the blanks.

I do not herein claim the hopper devices, for they are the subject of claims in a pending application.

Having thus fully described my invention, what I claim as new, and desire to secure by Letters Patent, is—

1. In a printing-machine, the combination of the type-cylinder with an indicating device, substantially as described, by which to set the type-cylinder so that the varying sizes of type-plates may meet the blanks as required, substantially in the manner shown and described.

2. The combination, with a type-cylinder, of the index-wheel E, having each cog or the rim numbered, with the indicator I', arranged on the shaft $d$, all arranged substantially in the manner shown, and for the purpose set forth.

3. The index-wheel E, having a toothed side, in combination with the indicator I', having a corresponding toothed side, and the nut $e$, for the purpose of effecting, by means of the feather on the type-cylinder shaft, a solid and immovable connection between type-cylinder shaft and cog-wheel E, substantially as set forth.

4. In a printing-machine, an adjustable feed mechanism, having the stops $b$ and C'' adjustably arranged on the rod H, and the spring $c'$, in combination with a hopper for holding the blanks, and an adjustable gate for passing one blank at a time to the printing-rollers, substantially as described.

5. The combination of the frame A A', shaft B', cog-wheel C', cog-wheels D and D', secured to the frame, as shown, the index-wheel E, indicator I, and type-cylinder J, all arranged, constructed, and operating substantially in the manner and for the purpose set forth.

6. In a printing-machine, a type-cylinder provided with a right and left screw-thread, and inwardly-chamfered clamps K, for holding the type-plate, substantially as described.

7. In a printing-machine, the combination of the shaft B', cog C', pitman E', crank F, shaft F', crank L', pitman $m$, lever M', having an arm, N', and slot $f'$, pawl O, shaft N, arm N'', roller 2, and ratchet-wheel O', all arranged, constructed, and operating substantially in the manner and for the purpose set forth.

In testimony that I claim the foregoing as my own I affix my signature in presence of two witnesses.

WM. F. WIDMAYER.

Witnesses:
HENRY M. SMITH,
JACOB APPELL.